Patented Sept. 5, 1944

2,357,380

UNITED STATES PATENT OFFICE 2,357,380

ANTISTATIC COATING FOR FILM

Gilbert W. Brant, Buffalo, N. Y., assignor to E. I. du Pont de Nemours & Company, Wilmington, Del., a corporation of Delaware No Drawing. Application January 7, 1943, Serial No. 471,627

4 Claims. (Cl. 106—213)

This invention relates to improvements in film, sheeting, pellicles and the like, prepared from organic solvent-soluble film-forming substances which, by nature, are relatively non-hygroscopic and non-conductors for electricity. More particularly, this invention relates to the treatment of such film, sheeting, pellicles and the like of organic solvent-soluble film-forming substances such as cellulose organic acid esters, cellulose ethers, polyvinyl acetate, polyvinyl acetal, nylon, etc. to substantially reduce electrostatic charges thereon.

In the manufacture and handling of films of organic solvent-soluble film-forming substances, for example, cellulose derivative films, there is a well known tendency for such films to accumulate electrostatic charges, generated usually by frictional contact of the film with apparatus parts necessarily encountered. Such accumulated charges are troublesome in that they render the film difficult to manipulate, resulting in frequent delays, waste, and in some instances, serious reduction in the quality of the film.

The art has long been concerned with ways and means of treating film to reduce or eliminate this tendency to accumulate static charges of electricity, but those proposals which have been successful in their chief objective all suffer from one or more defects which detract from their usefulness. Thus, many expedients involve expensive ingredients; some are based upon chemical modification of the surface of the film with consequent loss of desired characteristics, and still others involve the use of relatively large amounts of electrolytes which rapidly corrode the apparatus.

An object of this invention, therefore, is to provide a satisfactory anti-static coating for film, sheets and pellicles of organic solvent-soluble non-hygroscopic film-forming substances.

A further object is to provide an effective, inexpensive, anti-static coating for film which does not react chemically with the film.

These and other objects will more clearly appear hereinafter.

These objects are accomplished by my invention which, briefly stated, comprises thinly coating the sheet, film or pellicle of organic solvent-soluble, non-hygroscopic, film-forming substance with an aqueous composition comprising essentially starch, and a relatively small amount of an electrolyte, and thereafter drying the film to remove the water. The inclusion in the composition of a small amount of wetting agent facilitates the coating operation and hence is desirable in most instances.

Any of the readily available starches capable of forming low-viscosity pastes with water are suitable for the purposes of this invention. These include corn, rice, wheat, and potato starches. Soluble starch of the type commonly used as a laboratory reagent is preferred. Also, a thin boiling potato starch, such as is commonly used by laundries in starching fabrics, may be used with excellent results. Although the amount of starch in the aqueous composition may be varied from about 0.5% to about 3% by weight with satisfactory results, a composition containing about 1% by weight of starch is to be preferred.

Any electrolyte in amounts ranging from 0.03% to 0.20% by weight, i. e., from 1% to 40% by weight based on the weight of the starch, may be employed in the aqueous coating composition. Hygroscopic electrolytes, and especially potassium acetate and lithium chloride, in concentrations corresponding to about 0.05% by weight, are preferred.

Wetting agents from the group of alkali metal salts of sulfated higher alcohols, such as "Duponol ME," are favored. The amount of wetting agent contained in the aqueous composition may vary from about 0.2% to about 1.5%. About 0.5% of "Duponol ME" is most effective.

The aqueous composition is generally applied to both sides of the film, conventional coating expedients, e. g. passing the film through the composition or between applicator rolls, spraying, brushing, dipping, etc., being employed for the purpose.

My invention is further illustrated by the following example:

*Example*

An aqueous solution was made up by dissolving in distilled water heated to 80° C., 1% by weight of soluble starch such as used as a laboratory reagent, 0.5% "Duponol ME" and 0.05% potassium acetate, and after cooling to room temperature, strips of cellulose acetate film were passed through the solution and excess solution doctored off by means of glass rods. After drying, the samples were tested for electrostatic properties with an electroscope. This treated film would not accumulate an electrostatic charge even at humidities as low as 7% R. H. The dried coating which was extremely thin was invisible and in no way impaired the transparency of the film coated therewith. The film so formed also had excellent slip characteristics.

The composition of this invention provides an effective though inexpensive anti-static finish for films, sheets and pellicles of any of the relatively non-hygroscopic, electrically non-conductive, film-forming substances, examples of which are cellulose acetate, cellulose propionate, cellulose butyrate, methyl cellulose, ethyl cellulose, polyvinyl acetate, polyvinyl acetal, polyvinyl butyral, nylon, etc. Since only a very thin coating of the anti-static composition need be employed, the pliability of the film and consequent essential ease of manipulation is not noticeably altered. In addition, the composition functions as a protective size because of excellent slip characteristics. The amount of electrolyte contained in the composition is so small and the protective action of the starch is so effective that the corrosion of apparatus previously experienced with anti-static finishes of the same general type does not occur when my composition is employed. These are but some of the more obvious advantages of my invention. Additional advantages reside in cheapness of ingredients, ease of formulation, ease of application, and the fact that the film is not noticeably modified in either its mechanical or chemical structure.

It is understood, of course, that the preceding description is merely for purposes of illustration and that my invention is not strictly limited thereby but is susceptible rather to all modification and substitution of equivalents comprehended within the spirit of the invention as defined in the following claims.

I claim:

1. An anti-static composition suitable for coating films, sheets and pellicles of non-hygroscopic, electrically non-conducting, film-forming substances, comprising essentially from about 0.5% to about 3% by weight of starch, from about 0.03% to about 0.2% by weight of a hygroscopic electrolyte, from about 0.2% to about 1.5% by weight of a wetting agent, and the remainder of the composition being water.

2. An anti-static composition suitable for coating films, sheets and pellicles of non-hygroscopic, electrically non-conducting, film-forming substances, comprising essentially from about 0.5% to about 3% by weight of starch, from about 0.03% to about 0.2% by weight of potassium acetate, from about 0.2% to about 1.5% by weight of a wetting agent, and the remainder of the composition being water.

3. An anti-static composition suitable for coating films, sheets and pellicles of non-hygroscopic, electrically non-conducting, film-forming substances, comprising essentially from about 0.5% to about 3% by weight of starch, from about 0.03% to about 0.2% by weight of lithium chloride, from about 0.2% to about 1.5% by weight of a wetting agent, and the remainder of the composition being water.

4. An anti-static composition suitable for coating films, sheets and pellicles of non-hygroscopic, electrically non-conducting, film-forming substances, comprising essentially about 1% by weight of starch, about 0.05% by weight of potassium acetate, about 0.5% by weight of a wetting agent, the remainder of the composition being water.

GILBERT W. BRANT.